(12) United States Patent
Gaubas et al.

(10) Patent No.: US 11,611,556 B2
(45) Date of Patent: Mar. 21, 2023

(54) NETWORK CONNECTION REQUEST METHOD AND APPARATUS

(71) Applicant: Cujo LLC, El Segundo, CA (US)

(72) Inventors: Marius Gaubas, Vilnius (LT); Matti Niemenmaa, Helsinki (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 17/026,621

(22) Filed: Sep. 21, 2020

(65) Prior Publication Data
US 2022/0094682 A1   Mar. 24, 2022

(51) Int. Cl.
*H04L 29/06* (2006.01)
*H04L 9/40* (2022.01)

(52) U.S. Cl.
CPC ........ *H04L 63/0876* (2013.01); *H04L 63/029* (2013.01); *H04L 63/0236* (2013.01); *H04L 63/0263* (2013.01); *H04L 63/108* (2013.01); *H04L 63/166* (2013.01); *H04L 63/20* (2013.01)

(58) Field of Classification Search
CPC ............. H04L 63/0876; H04L 63/0236; H04L 63/0263; H04L 63/029; H04L 63/108; H04L 63/166; H04L 63/20; H04L 63/101; H04L 63/1433; H04L 63/1483; H04L 63/1425; G06F 21/554; G06F 21/566
See application file for complete search history.

(56) References Cited

U.S. PATENT DOCUMENTS

| | | | | |
|---|---|---|---|---|
| 8,589,503 B2 * | 11/2013 | Alperovitch | .......... | H04L 45/308 709/227 |
| 2010/0192196 A1 * | 7/2010 | Lee | .......... | G06F 21/55 726/4 |
| 2011/0296519 A1 * | 12/2011 | Ide | .......... | G06F 21/55 726/13 |
| 2012/0324094 A1 * | 12/2012 | Wyatt | .......... | H04W 4/60 709/224 |
| 2013/0117809 A1 * | 5/2013 | McDougal | .......... | G06F 21/567 726/1 |
| 2015/0372976 A1 * | 12/2015 | Lonas | .......... | H04L 63/1425 726/11 |

(Continued)

OTHER PUBLICATIONS

Extended European Search Report for European Patent Application No. 21196257.6, dated Jan. 26, 2022, 8 pages.

*Primary Examiner* — Sanchit K Sarker
(74) *Attorney, Agent, or Firm* — Dority & Manning, P.A.

(57) ABSTRACT

A network apparatus receives a connection request from a client computing device toward a target computing device. Next a target identifier that identifies the target computing device is extracted from the connection request. The connection request is sent to the target computing device and a reputation request with the target identifier is sent to a web resource analyser engine. In response to detecting that a response from the target computing device is received before a response from the web resource analyser engine, the response to the connection request from the target computing device is held by performing a rewrite in a target section of a user-space utility program rule and by using operating system kernel module in user-space memory area of the network apparatus. In response to a receipt of the response from the web resource analyser engine, the response to the connection request is released.

18 Claims, 4 Drawing Sheets

(56) References Cited

U.S. PATENT DOCUMENTS

| | | | |
|---|---|---|---|
| 2016/0142274 A1* | 5/2016 | Mulkey | H04L 43/0823 709/224 |
| 2020/0213116 A1* | 7/2020 | Fattal | H04L 63/0807 |
| 2022/0116409 A1* | 4/2022 | Niemenmaa | H04L 43/0876 |

* cited by examiner

NETWORK CONNECTION REQUEST METHOD AND APPARATUS

TECHNICAL FIELD

The present application relates generally to network security, and specifically to methods and apparatuses for managing network connection requests.

BACKGROUND

In various network security solutions, outgoing connections must often be authorized by an external service, such as a security service provider or the like. The external service may be used to determine whether the user is allowed to access the requested content or whether the content should be blocked, for example. However, the amount of time it takes for both a response from the requested website and a response from such external service checking the reputation of the requested website may be long and the user experience deteriorates.

There is a need for securing network connections while at the same time enabling also time efficient usage of resources.

SUMMARY

According to an aspect of the invention there is provided a method as specified in claim 1.

According to other aspect of the invention, there is provided an apparatus in a computer network system as specified in claim 12.

According to other aspect of the invention, there is provided a non-transitory computer-readable medium comprising stored program code, the program code comprised of computer-executable instructions that, when executed by a processor device, causes the processor device to operate as specified in claim 18.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
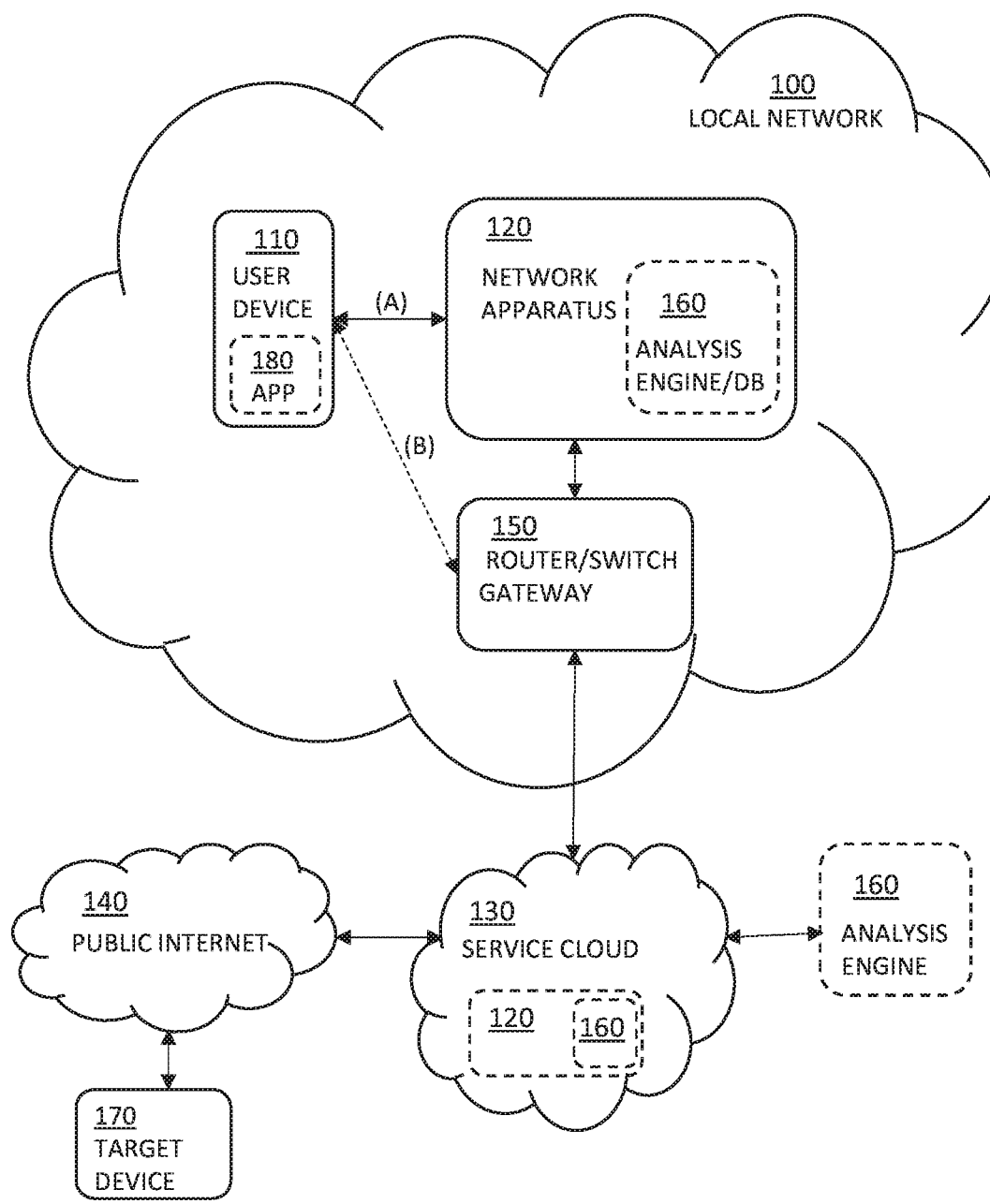
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more computing devices 110 with a client application 180, the network apparatus 120, a local gateway 150, and an analysis engine/database 160. The example system also includes a service cloud 130, such as a network operator's cloud or a security service provider's cloud and the Internet 140. The analysis engine 160, such as a web resource analysis engine, may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the client computing device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The client device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 may collect information e.g. about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g. via an Ethernet cable connected to a router) or using a wireless connection (e.g. via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user/client device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the gateway 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

Figure 2A:
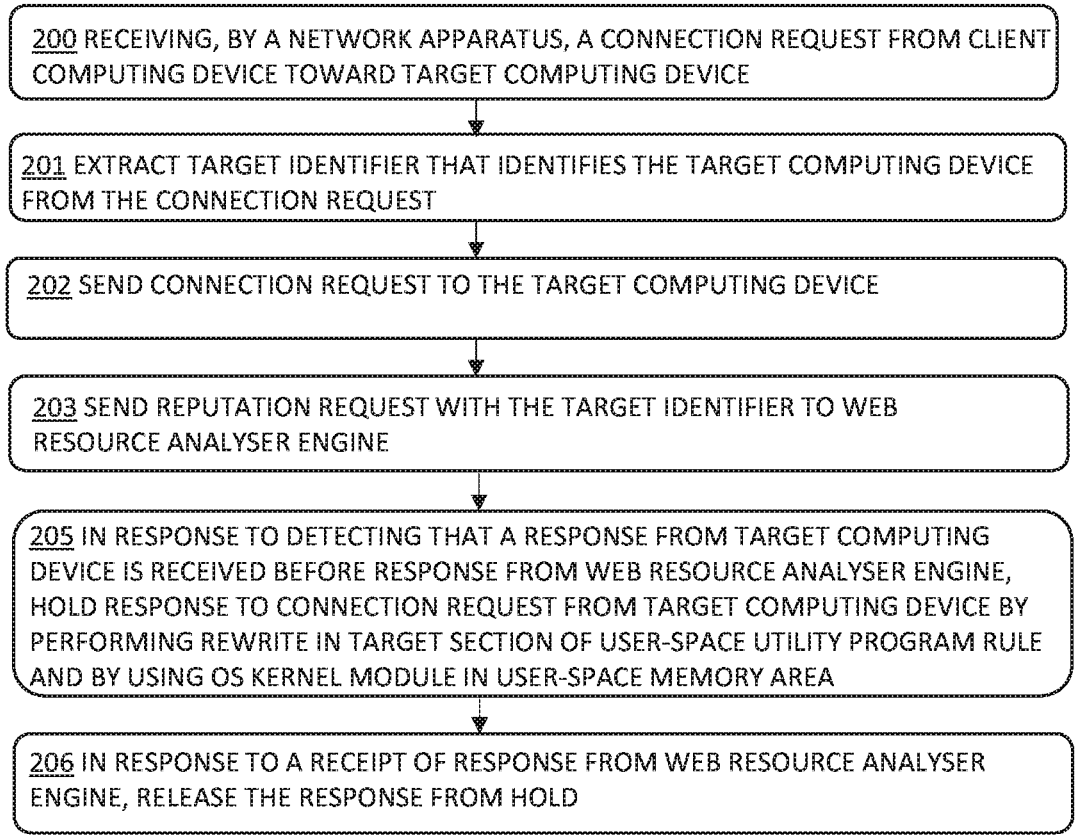
FIGS. 2A and 2B illustrate methods, according to embodiments.

FIG. 2A is a flow diagram illustrating an embodiment of a method at a network apparatus connecting one or more computing devices to a computer network. The network apparatus monitors connection requests relating to monitored network traffic passing through the network apparatus.

In 200, a connection request from a client computing device toward a target computing device is received by the network apparatus.

In 201, the network apparatus extracts target identifier data from the connection request that identifies the target computing device.

In 202, the network apparatus sends the connection request to the target computing device.

In 203, the network apparatus sends a reputation request with the target identifier to a web resource analyser engine.

In 205, in response to detecting that a response to the connection request from the target computing device is received before a response from the web resource analyser engine, the response to the connection request from the target computing device is held by performing a rewrite in a target section of a user-space utility program rule and by using an operating system kernel module in user-space memory area.

In 206, in response to a receipt of response from the web resource analyser engine, the response to the connection request is released from hold.

Figure 2B:
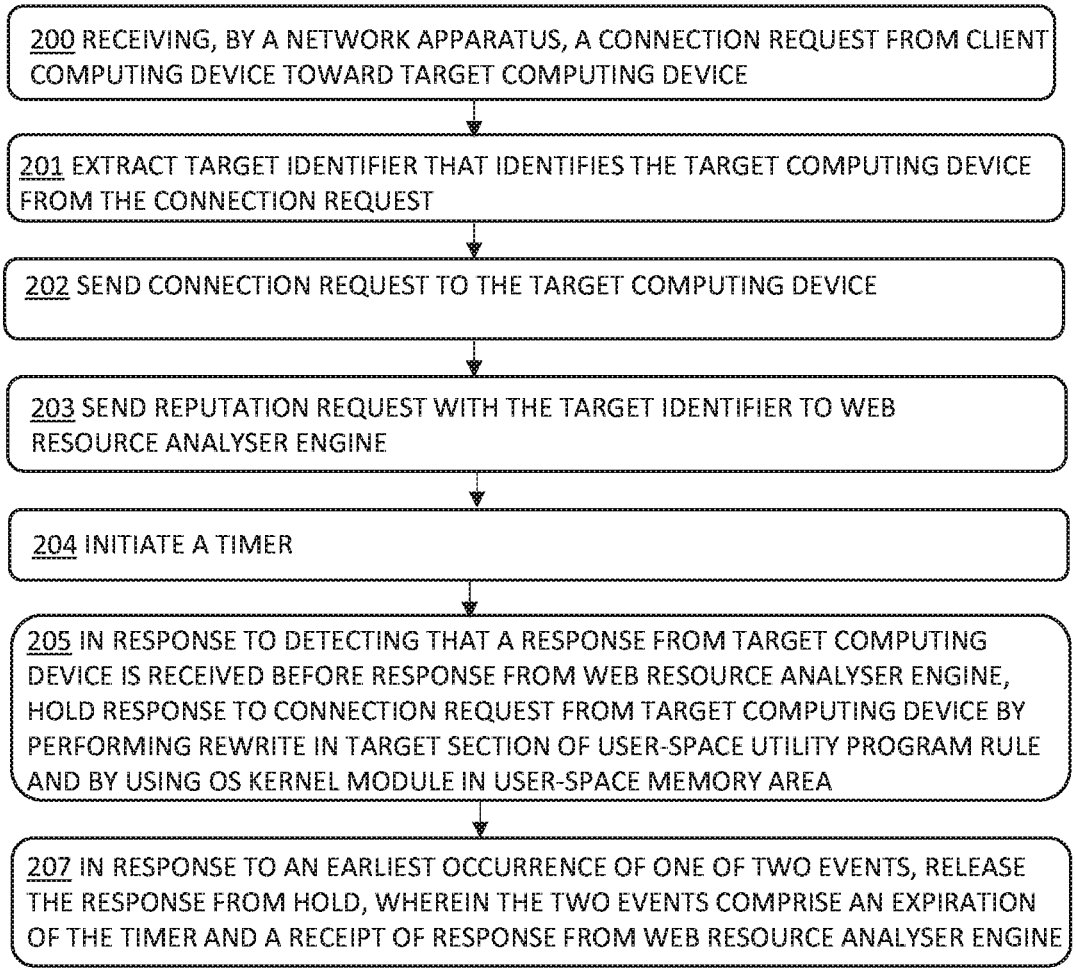

FIG. 2B is a flow diagram illustrating another embodiment of a method at a network apparatus connecting one or more computing devices to a computer network. The network apparatus monitors connection requests relating to monitored network traffic passing through the network apparatus.

In 200, a connection request from a client computing device toward a target computing device is received by the network apparatus.

In 201, the network apparatus extracts target identifier data from the connection request that identifies the target computing device.

In 202, the network apparatus sends the connection request to the target computing device.

In 203, the network apparatus sends a reputation request with the target identifier to a web resource analyser engine.

In 204, a timer is initiated.

In 205, in response to detecting that a response to the connection request from the target computing device is received before a response from the web resource analyser engine, the response to the connection request from the target computing device is held by performing a rewrite in a target section of a user-space utility program rule and by using an operating system kernel module in user-space memory area.

In 207, in response to an earliest occurrence of one of two events, the response to the connection request is released, wherein the two events comprise an expiration of the timer and a receipt of response from the web resource analyser engine.

In an embodiment, the target identifier comprises a URL (Uniform Resource Locator) extracted from a header (when an HTTP(S) request to the target computer is made) or SNI (Server Name Indication) extracted from a TLS (Transport Layer Security) handshake.

In an embodiment, the network apparatus is installed on a network gateway.

In an embodiment, in response to detecting expiration of the timer before the receipt of the response from the web resource analyser engine has been received, the connection request is approved.

In an embodiment, the method further comprises in response to receipt of the response from the web resource analyser engine before expiration of the timer, approving the connection request or denying the connection request based on the response from the web resource analyser engine.

In an embodiment, the method further comprises in response to detecting that the response from the web resource analyser engine is received before a response from the target computing device, approving or denying the connection request based on the response from the web resource analyser when the response from the target computing device is received.

In an embodiment, the method further comprises maintaining a local cache of reputation request response data received from the web resource analyser engine and in response to detecting a further connection request to the target computing device, wherein respective reputation request response data of the same target computing device being already in the local cache of reputation request response data, approving or denying the further connection request between the client computing device and the target computing device without sending a further reputation request to the web resource analyser engine.

In an embodiment, the user-space utility program comprises a kernel-level iptables component used for configuring IP packet filter rules.

In an embodiment, the operating system kernel module comprises a netfilter queue used for managing network packets in iptables components.

In an embodiment, the method further comprises determining, based on the response from the web resource analyser engine, that the target computing device belongs to a third-party tracker and, based on determining that the target computing device belongs to the third-party tracker, blocking connections between the client computing device and the target computing device, wherein blocking the connection between the client computing device and the target computing device further comprises one of: sending a HTTP (Hypertext Transfer Protocol) or a TLS (Transport Layer Security) message indicating a message was received and no content is to be displayed, and terminating the connection.

In an embodiment, the timer is initiated for setting a predetermined time period to hold the response to the connection request from the target computing device.

Figure 3:
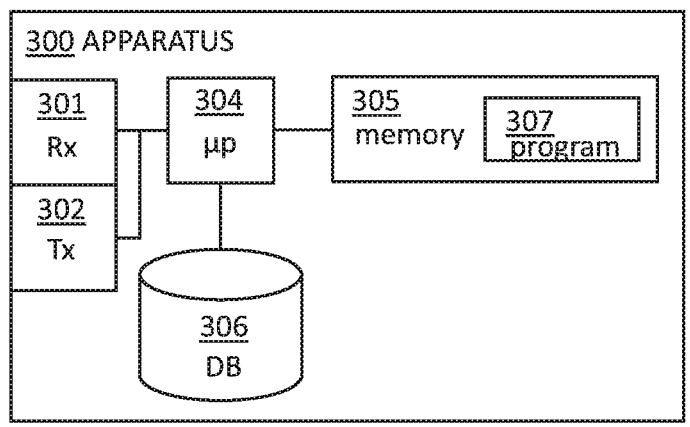
FIG. 3 is a block diagram of an apparatus, according to one embodiment.

Turning now to FIG. 3 that is showing an example of a network apparatus such as a gateway.

A processor is provided that is configured to detect connection requests relating to monitored network traffic passing through the network apparatus. Further, the processor 304 is configured to interrupt transmission of connection requests from a client computing devices to a target computing devices and to extract data identifying the target network computer based on the connection request. The processor is further configured to allow transmission of the connection request to continue to the target computing device and to transmit a reputation request comprising the extracted data identifying the target computing device to a web resource analyser engine. In some embodiments, the analysis can also be implemented in some other device internal to the apparatus 300. The processor further monitors receiving responses to the connection request from the target computing device and to the reputation request from the web resource analyser engine. In response to detecting that the response to the connection request from the target computing device is received before the response to the reputation request, the processor is configured to hold the response to the connection request from the target computing device by performing a rewrite in a target section of a user-space utility program rule and by using operating system kernel module in user-space memory area of the network apparatus. In response to a receipt of the response from the web resource analysis engine, the processor is configured to release the response from hold.

In an embodiment, the processor 304 is further configured to store data such as data related to the connection requests, state information, reputation data and domain data to the database 306. The database 306 is shown in this example as being located at the apparatus 300, but it will be appreciated that the apparatus 304 may alternatively access a remote database. The database 304 may comprise data collected from user devices or reputation data previously collected from the web resource analyzer engine.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
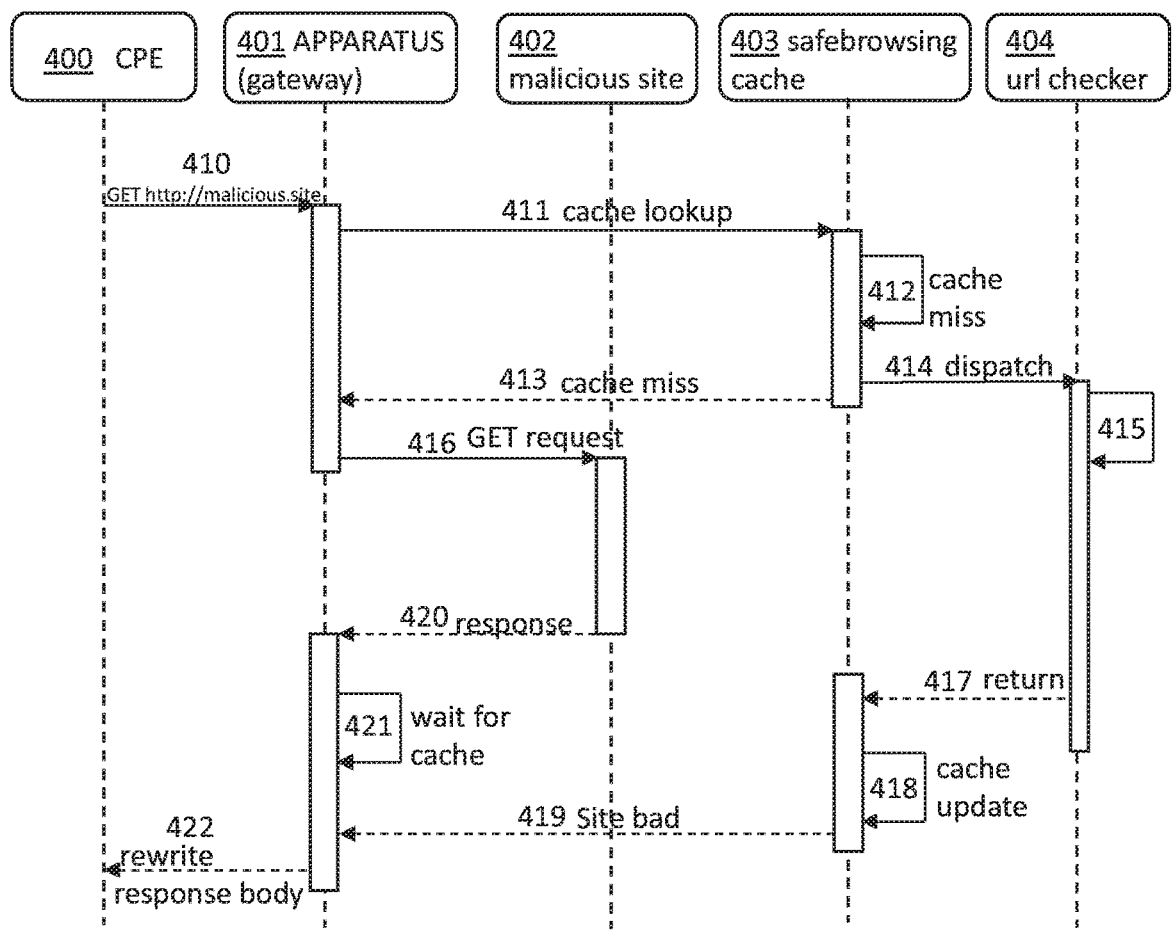
FIG. 4 a signal sequence diagram illustrating a process, according to one embodiment.

FIG. 4 shows an example general flow diagram of a lookup according to an embodiment.

A network apparatus, such as a home network router (CPE) 400 has received a connection request (410) to a malicious site. At the network gateway 401, when an HTTP (S) request to the target malicious site 402 is made, a URL is extracted from the header or in the case of HTTPS, an SNI is extracted from a TLS handshake. The request is allowed to continue (416) out to the target malicious site 402 and at the same time a request containing the URL/SNI (414) is sent to the URL analyser 404 for an URL check (415) and a timer is started.

If a response (420) from the target malicious site 402 is received after the response 417, 418, 419 from the URL analyser 404, then the response is immediately processed (422), that is, rewritten, dropped or allowed through depending on the URL analyser 404 result.

If the response (420) from the target malicious site 402 is received before the response from the URL analyser 404, the response is held (421) on the network gateway 401 until the response from the URL analyser is received. Then the response is processed, that is, rewritten, dropped or allowed through depending on the URL analyser 404 result.

In an embodiment, if the response from the target malicious site 402 is received and the result from the URL analyser 404 takes longer than a predefined time limit measured with the timer, then the response is held until the timer has expired and the response is allowed through.

Thus, the maximum waiting time a user experiences since sending the request can be timeout of the timer or the response time from the target malicious site depending on the response time of the target malicious site.

In an embodiment, a local cache 403 can be used on the gateway that stores URL analyser responses. This enables addressing subsequent requests to the same target malicious site without any delay. Thus, before a request to the URL analyser 404 is sent, a cache lookup process can be made (411, 412, 413).

Figure 5:
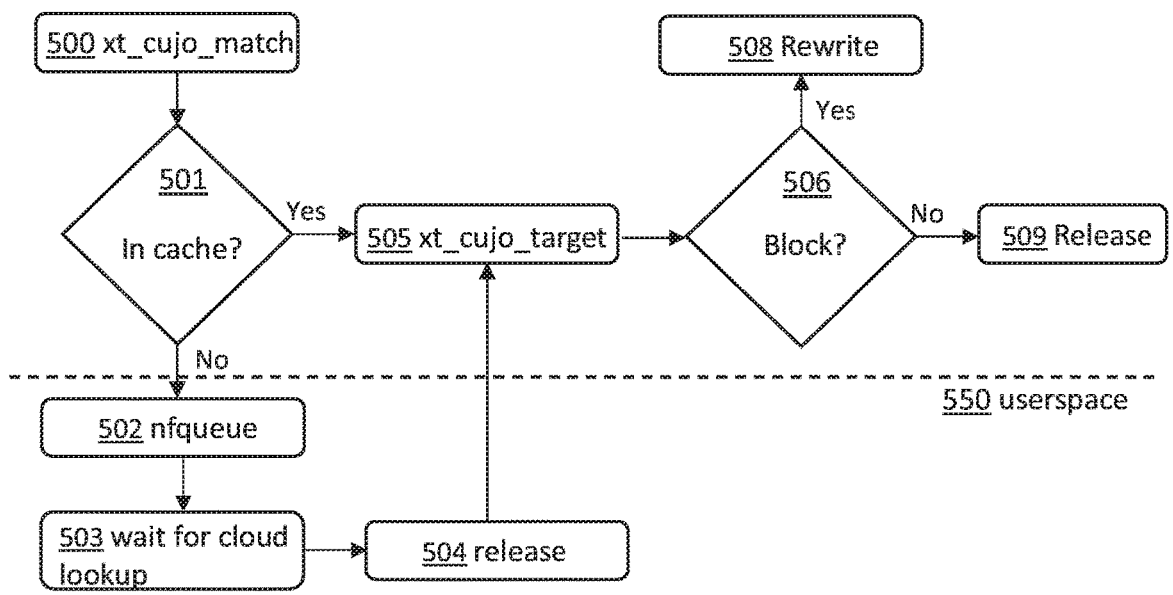
FIG. 5 is a flow diagram illustrating a process, according to one embodiment.

Holding the response from the target site while waiting for the URL analyser response requires also consideration. For example, holding the response in a match section of an iptables may lead into an unstable state if the local interface is taken down during the hold. Thus, in an embodiment, holding of the response is implemented by performing the rewrite in a target section of an iptables rule and using NFQUEUE in user-space to hold a data packet while the URL analyser response is being waited. Example flow of Linux kernel to know if a packet is being held and thus correctly manage its memory allowing safe operations if the local interface is destroyed is illustrated in FIG. 5.

In 500, target data (URL/SNI) is extracted. In 501, it is determined whether the target data is already in cache. If yes, then in 505 response from the target is waited. If no, then at user-space level 550 NFQUEUE is used to hold the data packet 502 and in 503 cloud lookup results for the reputation analysis are waited. After the reputation analysis is received, then the data packet is released 504. In 506, based on the received response from the reputation analysis, the connection between the computer device and the target is managed. For example, if the connection is to be blocked, then 508 is entered where the response can be rewritten or if the connection is allowed, then 509 is entered to release the connection.

Iptables is a user-space utility program allowing configuring IP packet filter rules of a firewall. The filters are organized in different tables containing chains of rules for how to treat network traffic packets. Different kernel modules and programs can be used for different protocols. NFQUEUE (Netfilter queue) is a kernel and user mode module for managing network packets in iptables. It enables writing netfilter target modules in user-space. NFQUEUE provides access to packet matched by the iptables rule in Linux.

According to embodiments of the invention, the connection requests are managed in a way that the amount of time waiting for a response from the requested resources is minimized while at the same time the security of the requested resources can be determined by an external service.

It will be appreciated that various modifications may be made to the above described embodiments without departing from the scope of the present invention. For example, the database or web resource analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises one or more codes for performing the process steps according to the described example embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a network apparatus comprising a processor device, a connection request sent from a client computing device toward a target computing device;
   extracting, from the connection request, a target identifier that identifies the target computing device;
   at a same time:
      sending, by the network apparatus, the connection request to the target computing device;
      sending, by the network apparatus, a reputation request with the target identifier to a web resource analyser engine; and
      initiating a timer;
   in response to detecting that a response to the connection request from the target computing device is received before a response from the web resource analyser engine, holding the response to the connection request from the target computing device; and
   in response to detecting an expiration of the timer before a receipt of the response from the web resource analyser engine, approving the connection request and releasing the response to the connection request, and in response to the receipt of the response from the web resource analyser engine before the expiration of the timer, approving the connection request based on the response from the web resource analyser engine and releasing the response to the connection request, or denying the connection request based on the response from the web resource analyser engine.

2. The method according to claim 1, wherein the target identifier comprises a Uniform Resource Locator (URL) extracted from a header or a Server Name Indication (SNI) extracted from a Transport Layer Security (TLS) handshake.

3. The method according to claim 1, wherein the network apparatus is installed on a network gateway.

4. The method according to claim 1, the method further comprising in response to detecting that the response from the web resource analyser engine is received before the response to the connection request from the target computing device, approving or denying the connection request based on the response from the web resource analyser engine when the response to the connection request from the target computing device is received.

5. The method according to claim 1, the method further comprising maintaining a local cache of reputation request response data received from the web resource analyser engine and in response to detecting a further connection request to the target computing device, wherein respective reputation request response data of a same target computing device being already in the local cache of reputation request response data, approving or denying the further connection request without sending a further reputation request to the web resource analyser engine.

6. The method according to claim 1, wherein the user-space utility program comprises a kernel-level iptables component used for configuring IP packet filter rules.

7. The method according to claim 1, wherein the operating system kernel module comprises a netfilter queue used for managing network packets in iptables components.

8. The method according to claim 1, the method further comprising determining, based on the response from the web resource analyser engine, that the target computing device belongs to a third-party tracker and, based on determining that the target computing device belongs to the third-party tracker, blocking connections between the client computing device and the target computing device, wherein blocking the connection between the client computing device and the target computing device further comprises one of: sending a Hypertext Transfer Protocol (HTTP) or a Transport Layer Security (TLS) message indicating a message was received and no content is to be displayed, and terminating the connection.

9. The method according to claim 1, wherein holding the response to the connection request includes performing a rewrite in a target section of a user-space utility program rule and by using an operating system kernel module in a user-space memory area of the network apparatus.

10. An apparatus in a computer network system comprising:
    one or more processor devices; and
    a non-transitory computer-readable medium comprising stored program code, the program code comprised of computer-executable instructions that, when executed by the one or more processor devices, cause the one or more processor devices to:
       receive a connection request sent from a client computing device toward a target computing device;
       extract, from the connection request, a target identifier that identifies the target computing device;
       at a same time:
          send the connection request to the target computing device;
          send a reputation request with the target identifier to a web resource analyser engine; and
          initiate a timer;
       in response to detecting that a response to the connection request from the target computing device is received before a response from the web resource analyser engine, hold the response to the connection request from the target computing device; and
       in response to detection of an expiration of the timer before a receipt of the response from the web resource analyser engine, approve the connection request and release the response to the connection request, and in response to the receipt of the response from the web resource analyser engine before the expiration of the timer, approve the connection request based on the response from the web resource analyser engine and release the response to the connection request, or deny the connection request based on the response from the web resource analyser engine.

11. The apparatus according to claim 10, wherein the target identifier comprises a Uniform Resource Locator (URL) extracted from a header or Server Name Indication (SNI) extracted from a Transport Layer Security (TLS) handshake.

12. The apparatus according to claim 10, the one or more processor devices being further configured to maintain a local cache of reputation request response data received from the web resource analyser engine and in response to detecting a further connection request to the target computing device, wherein respective reputation request response data of a same target computing device being already in the local cache of reputation request response data, approve or deny the further connection request without sending a further reputation request to the web resource analyser engine.

13. The apparatus according to claim 10, wherein the user-space utility program comprises a kernel-level iptables component used for configuring IP packet filter rules.

14. The apparatus according to claim 10, wherein the operating system kernel module comprises a netfilter queue used for managing network packets in iptables components.

15. The apparatus according to claim 10, the one or more processor devices being further configured to determine, based on the response from the web resource analyser engine, that the target computing device belongs to a third-party tracker, and based on determining that the target computing device belongs to the third-party tracker, block connections between the client computing device and the target computing device, wherein blocking the connection between the client computing device and the target computing device further comprises one of: sending a Hypertext Transfer Protocol (HTTP) or a Transport Layer Security (TLS) message indicating a message was received and no content is to be displayed, and terminating the connection.

16. The apparatus according to claim 10, wherein the hold the response to the connection request includes performing a rewrite in a target section of a user-space utility program rule and by using an operating system kernel module in a user-space memory area of the network apparatus.

17. A non-transitory computer-readable medium comprising stored program code, the program code comprised of computer-executable instructions that, when executed by a processor device, causes the processor device to:
receive a connection request sent from a client computing device toward a target computing device;
extract, from the connection request, a target identifier that identifies the target computing device;
at a same time:
send the connection request to the target computing device;
send a reputation request with the target identifier to a web resource analyser engine; and
initiate a timer;
in response to detecting that a response to the connection request from the target computing device is received before a response from the web resource analyser engine, hold the response to the connection request from the target computing device; and
in response to detection of an expiration of the timer before a receipt of the response from the web resource analyser engine, approve the connection request and release the response to the connection request, and in response to the receipt of the response from the web resource analyser engine before the expiration of the timer, approve the connection request based on the response from the web resource analyser engine and release the response to the connection request, or deny the connection request based on the response from the web resource analyser engine.

18. The non-transitory computer-readable medium according to claim 17, wherein the hold the response to the connection request includes performing a rewrite in a target section of a user-space utility program rule and by using an operating system kernel module in a user-space memory area of the network apparatus.

\* \* \* \* \*